United States Patent
Huffman et al.

(10) Patent No.: US 7,613,395 B2
(45) Date of Patent: Nov. 3, 2009

(54) OPTICAL NETWORK TERMINATION APPARATUS WITH SHARED COMPONENTS AND PASSIVE OPTICAL NETWORK SYSTEM COMPRISING SAME

(75) Inventors: Jonathan Huffman, Raleigh, NC (US); Ray Tyrrell, Raleigh, NC (US); Hal Thorne, Raleigh, NC (US); Dirk Corsus, Raleigh, NC (US); Duane Remein, Raleigh, NC (US); David Eckard, Garner, NC (US); Travis Lentz, Raleigh, NC (US)

(73) Assignee: Alcatel Lucent, Paris (FR)

( * ) Notice: Subject to any disclaimer, the term of this patent is extended or adjusted under 35 U.S.C. 154(b) by 614 days.

(21) Appl. No.: 10/990,157

(22) Filed: Nov. 16, 2004

(65) Prior Publication Data
US 2006/0104637 A1 May 18, 2006

(51) Int. Cl.
*H04J 14/00* (2006.01)
(52) U.S. Cl. .............................. 398/72; 398/66; 398/67; 398/68; 398/69; 398/74; 398/75; 398/98; 398/99; 398/100; 370/352; 370/392; 370/389; 370/465; 725/121; 725/125; 725/129; 725/105; 725/106
(58) Field of Classification Search ................... 398/72, 398/70, 71, 66, 67, 68, 75, 79, 98, 99, 100, 398/58, 59, 69, 74, 168; 725/121, 129, 125, 725/127, 119, 105, 106; 320/352, 356, 395.53; 370/352, 395.53, 389, 465, 392, 390, 468
See application file for complete search history.

(56) References Cited

U.S. PATENT DOCUMENTS 5,191,456 A 3/1993 Sutherland et al.
5,793,506 A 8/1998 Wolfgang
6,546,014 B1 4/2003 Kramer et al.
7,058,966 B2 * 6/2006 BuAbbud .................... 725/106

(Continued)

FOREIGN PATENT DOCUMENTS

EP 0 337 619 A1 10/1989

(Continued)

OTHER PUBLICATIONS

Eiger, et al.; Present Value of Expenditures for Phsed Fiber-in-the-Loop Deployment; Global Telecommunications Conference, 1991; Globecom '91; Countdown to the New Millennium; Featuring a Mini-Theme on: Personal Communications Services; Dec. 2-5, 1991; pp. 1834-1839; vol. 3.

(Continued)

*Primary Examiner*—Hanh Phan
(74) *Attorney, Agent, or Firm*—RG & Associates LLC

(57) ABSTRACT

A transmission system for a passive optical network comprises a shared optical transmission apparatus, a shared electrical interface apparatus and a plurality of transmission convergence termination units. The shared optical transmission apparatus is configured for being coupled to an optical line termination unit via an optical fiber. The shared electrical interface apparatus is coupled to the shared optical transmission apparatus. The plurality of transmission convergence termination units is coupled to the shared electrical interface apparatus. Each one of the transmission convergence termination units is configured for selectively controlling the shared electrical interface apparatus.

16 Claims, 2 Drawing Sheets

U.S. PATENT DOCUMENTS

| | | | |
|---|---|---|---|
| 7,103,907 B1 * | 9/2006 | Buabbud | 725/129 |
| 7,286,769 B1 * | 10/2007 | BuAbbud et al. | 398/155 |
| 7,412,169 B2 * | 8/2008 | Joo et al. | 398/72 |
| 2004/0131357 A1 | 7/2004 | Farmer et al. | |
| 2005/0169632 A1 * | 8/2005 | Song et al. | 398/72 |

FOREIGN PATENT DOCUMENTS

| | | | |
|---|---|---|---|
| EP | 0337619 A | 10/1989 | |

OTHER PUBLICATIONS

Eiger M I et al: "Present value of expenditures for phased fiber-in-the-loop deployment" Countdown to the New Milennium. Phoenix, Dec. 2-5, 1991, Proceedings of the Global Telecommunications Conference. (Globecom), New York, IEEE, US, vol. vol. 3, Dec. 2, 1991, pp. 1834-1839, XP010042637 ISBN: 0-87942-697-7.

* cited by examiner

OPTICAL NETWORK TERMINATION APPARATUS WITH SHARED COMPONENTS AND PASSIVE OPTICAL NETWORK SYSTEM COMPRISING SAME

FIELD OF THE DISCLOSURE

The disclosures made herein relate generally to passive optical networks and more particularly to optical network termination apparatuses.

BACKGROUND

A Passive Optical Network (PON) system enables the shared use of fiber for services such as data, voice and video over between a central office and service subscriber sites. A PON system is relatively inexpensive to deploy and operate due to the compact size and passive nature of much of the equipment comprised by the PON system facilities. For example, a passive optical splitter that fans fiber out to service subscribers in a PON system is relatively small, uses no electronics and requires no power source.

Current and emerging PON systems offer cost-effective, end-to-end solutions that are capable of delivering a combination of high-demand services. Specific examples of such current and emerging PON systems include Broadband PON (BPON), Ethernet PON (EPON) and Gigabit PON (GPON). Examples of services that can be provided via such PON systems include various types of telephony services, data transmission services and video services. Signals for such services are transported optically from the central office (CO) or headend (HE) to an optical-network termination unit (ONT) at a service subscriber's site. The ONT is configured to provide optical network termination functionality and, in some implementations, to also provide conventional network interface device functionality.

Conventional Bi-Directional PON solutions (e.g., in accordance with International Telecommunication Union (ITU) standard G.983, ITU standard G.984 and Institute of Electrical and Electronics Engineers (IEEE) standard 802.3ah) provide for a backbone fiber, which is deployed from a serving source. An optical line terminal (OLT) at the CO is an example of such a servicing source. The backbone fiber extends to a distribution point where, typically, an optical splitter is employed for connecting branch fibers between the backbone fiber and multiple ONTs. In such a conventional arrangement, each one of the ONTs comprises respective optical front-end components for facilitating interface functionality with a signal carried by the respective branch fiber.

The arrangement of optical splitters and ONTs comprising respective optical front-end components in conventional PON systems is known to present a number of drawbacks. For one, an abundance of optical components at the far end of a backbone fiber adversely impacts reliability. The number of optical components required for interfacing with ONTs in a conventional PON system (e.g., optical splitters and optical front-end component of ONTs) is proportional to by the number of ONT's being served, thus increasing the potential for downtime and the need for service calls. Another drawback is the inherent cost associated with implementing and maintaining such optical component required for interfacing with ONTs. Similar to reliability, deployment and maintenance costs are directly impacted by the number of optical component required for interfacing with ONTs in a conventional PON system. As previously mentioned, each ONT in a conventional PON system comprises respective optical front-end components for facilitating interface functionality with a signal carried by the respective branch fiber, thus directly impacting deployment and maintenance costs.

Therefore, facilitating transmission of optical signals in a manner that overcomes drawbacks associated with conventional ONTs in a PON system would be novel, advantageous and useful.

SUMMARY OF THE DISCLOSURE

An embodiment of a transmission system for a passive optical network in accordance with the inventive disclosures made herein comprises a shared optical transmission apparatus, a shared electrical interface apparatus and a plurality of transmission convergence termination units. The shared optical transmission apparatus is configured for being coupled to an optical line termination unit via an optical fiber. The shared electrical interface apparatus is coupled to the shared optical transmission apparatus. The plurality of transmission convergence termination units is coupled to the shared electrical interface apparatus. Each one of the transmission convergence termination units is configured for selectively controlling the shared electrical interface apparatus to facilitate bi-directional signal transmission.

An embodiment of a method for facilitating signal transmission in a passive optical network in accordance with the inventive disclosures made herein comprises operations for directing a downstream signal toward a designated user device interface and selectively controlling an upstream transmission portion of the shared electrical interface apparatus. The operation for directing the downstream signal is performed in response to receiving the downstream signal from a downstream transmission portion of the shared electrical interface apparatus. The operation for selectively controlling the upstream transmission portion of the shared electrical interface apparatus is performed in a manner for enabling transmission of an upstream signal via a shared optical transmission apparatus.

Another embodiment of a transmission system for a passive optical network in accordance with the inventive disclosures made herein comprises at least one data processing device configured for facilitating transmission convergence functionality, instructions processable by the at least one data processing device, and an apparatus from which the instructions are accessible by the at least one data processing device. Furthermore, the instructions are configured for enabling the at least one data processing device to facilitate directing a downstream signal toward a designated user device interface and selectively controlling an upstream transmission portion of the shared electrical interface apparatus. The operation for directing the downstream signal is performed in response to receiving the downstream signal from a downstream transmission portion of the shared electrical interface apparatus. The operation for selectively controlling the upstream transmission portion of the shared electrical interface apparatus is performed in a manner for enabling transmission of an upstream signal via a shared optical transmission apparatus.

Correspondingly, it is a principal object of the inventive disclosures made herein to facilitating distribution of optical signals in a manner that overcomes drawbacks associated with conventional ONTs in a PON system. Specifically, embodiments of systems and methods in accordance with the inventive disclosures made herein offer increased reliability as they do not comprise an abundance of optical components at the far end of a backbone fiber. By eliminating such abundance of optical components at the far end of a backbone fiber, the potential for downtime and the need for service calls are correspondingly reduced. Furthermore, embodiments of systems and methods in accordance with the inventive disclosures made herein offer improved cost-effectiveness with respect to implementing and maintaining optical components required for interfacing with ONTs. Accordingly, embodiments of systems and methods in accordance with the inventive disclosures made herein are advantageous, novel and useful with respect to conventional ONTs in a PON system.

Turning now to specific embodiments of the inventive disclosures made herein, in at least one embodiment of a system in accordance with the inventive disclosures made herein, the shared electrical interface apparatus includes a buffering device coupled between the shared optical transmission apparatus and each one of the transmission convergence termination units, thereby enabling a downstream signal to be broadcast to a plurality of ONTs.

In at least one embodiment of a system in accordance with the inventive disclosures made herein, the shared electrical interface apparatus includes an electrical multiplexing device coupled between the shared optical transmission apparatus and each one of the transmission convergence termination units, thereby enabling upstream signals from a plurality of ONTs to be integrated.

In at least one embodiment of a system in accordance with the inventive disclosures made herein, each one of the transmission convergence termination units includes control logic configured for enabling selective control of the shared electrical interface apparatus.

In at least one embodiment of a system in accordance with the inventive disclosures made herein, the buffering device of the shared electrical interface apparatus includes a 1:N type buffer where N=1 or where N>1.

In at least one embodiment of a system in accordance with the inventive disclosures made herein, the shared optical transmission apparatus includes an optical multiplexing device, a laser driver device coupled between the optical multiplexing device and shared electrical interface apparatus for enabling upstream transmission functionality, and a clock and data recovery device coupled between the optical multiplexing device and the buffering device for enabling downstream transmission functionality.

In at least one embodiment of a system in accordance with the inventive disclosures made herein, each one of the transmission convergence termination units includes a plurality of user device interfaces and each one of the transmission convergence termination units includes control logic configured for enabling selective control of the shared electrical interface apparatus to selectively facilitate transmission of information between the shared electrical interface apparatus and each one of the user device interfaces.

In at least one embodiment of a method in accordance with the inventive disclosures made herein, an operation is provided for broadcasting a downstream signal from the downstream transmission portion of the shared electrical interface apparatus for reception by a plurality of transmission convergence termination units, thereby enabling delivery of the downstream signal to a designated user device interface of a corresponding one of the transmission convergence termination units.

In at least one embodiment of a method in accordance with the inventive disclosures made herein, selectively controlling the upstream portion of the shared electrical interface apparatus includes selectively controlling an electrical multiplexing device of a shared electrical interface apparatus for enabling selectively controlled access to an upstream laser driver device.

In at least one embodiment of a method in accordance with the inventive disclosures made herein, the electrical multiplexing device is a prioritizing-type multiplexing device and selectively controlling the upstream portion of the shared electrical interface apparatus includes performing the selectively controlling in a prioritized manner with respect to a plurality of apparatuses coupled to and configured for controlling the electrical multiplexing device.

These and other objects and embodiments of the inventive disclosures made herein will become readily apparent upon further review of the following specification and associated drawings.

BRIEF DESCRIPTION OF THE DRAWING FIGURES

DETAILED DESCRIPTION OF THE DRAWING FIGURES

Figure 1:
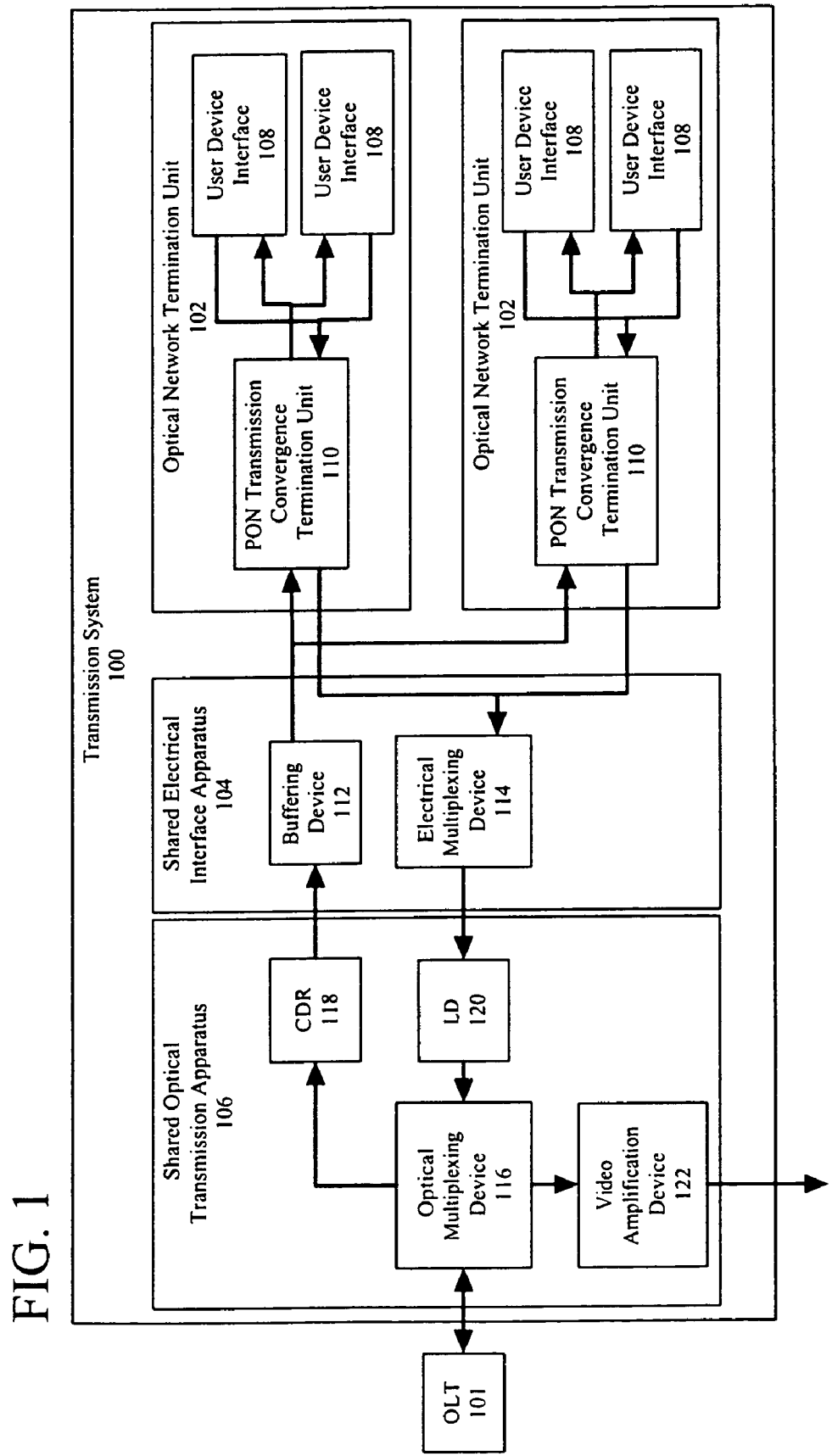
FIG. 1 depicts an embodiment of a transmission system for a passive optical network (PON) in accordance with the inventive disclosures made herein.

FIG. 1 depicts an embodiment of a transmission system 100 for a passive optical network (PON) in accordance with the inventive disclosures made herein. The transmission system 100 is connected to an optical line termination unit 101 via an optical fiber, thereby enabling transmission of signals therebetween. The transmission system 100 includes a plurality of optical network termination units 102, a shared electrical interface apparatus 104 and a shared optical transmission apparatus 106. The shared electrical interface apparatus 104 is connected between the shared optical transmission apparatus 106 and each one of the optical network termination units 102.

It should be understood that in FIG. 1, the lines designate general flow of signals. However, the lines are not intended to depict a particular type of signaling approach. For example, a point-to-point signal approach or shared bus signaling approach may be implemented. A point-to-point signaling approach is preferable due to complexities associated with implementing a shared bus for preferred signaling rates.

Each one of the optical network termination units 102 includes a plurality of user device interfaces 108 and a PON transmission convergence termination unit 110. The user device interfaces 108 of each optical network termination units 102 are connected to the PON transmission convergence termination unit 110 of the respective optical network termination unit 102. Each user device interface 108 of a particular optical network termination unit 102 is connected to the respective PON transmission convergence termination unit 110 in a manner enabling bi-directional signal transmission (i.e., upstream and downstream signal transmission) therebetween.

The shared electrical interface apparatus 104 includes a buffering device 112 and an electrical multiplexing device 114. The buffering device 112 is connected to the PON transmission convergence termination unit 110 of each one of the optical network termination units 102 in a manner enabling downstream signal transmission therebetween (i.e., from the buffering device 112 toward either one of the optical network termination units 102). The electrical multiplexing device 114 is connected to the PON transmission convergence termination unit 110 of each one of the optical network termination units 102 in a manner enabling upstream signal transmission therebetween (i.e., from either one of the optical network termination units 102 toward the electrical multiplexing device 114). The buffering device 112 and the electrical multiplexing device 114 are embodiments of a downstream transmission portion and an upstream transmission portion, respectively, of a shared electrical interface apparatus in accordance with the inventive disclosures made herein.

The shared optical transmission apparatus 106 includes an optical multiplexing device 116, a clock and data recovery device 118, a laser driver device 120 and a video amplification device 122. The optical multiplexing device 116 is an embodiment of an optical device configured for combining and/or separating optical signals of at least three different wavelengths. The clock and data recovery device 118 facilitates the processes of extracting and reconstructing clock and data information from an optical signal. A burst mode laser driver is an embodiment of the laser driver device 120. Accordingly, the shared optical transmission apparatus 106 is an embodiment of a shared optical front end in accordance with the inventive disclosures made herein.

As depicted in FIG. 1, the optical multiplexing device 116 is preferably an optical triplexing device (i.e., configured for combining and/or separating three different optical signals). In other embodiments (not specifically shown), where the video amplification device 122 is omitted, the optical multiplexing device 116 may be an optical diplexing device (i.e., configured for combining and/or separating two different optical signals).

The clock and data recovery device 118 is connected between the buffering device 112 and the optical multiplexing device 116 for enabling interaction therebetween. The laser driver device 120 is connected between the electrical multiplexing device 114 and the optical multiplexing device 116. The video driver 122 is connected to the optical multiplexing device 116 for enabling an amplified video signal to be outputted from the transmission system 100.

Advantageously, the transmission system 100 shares front-end optical components that are conventionally comprised by each one of the optical network termination units 102. In this manner, the optical network termination units 102 are embodiments of electrical optical network termination units in accordance with the inventive disclosures made herein. Such electrical optical network termination units are devoid of conventional optical module components such as the components for facilitating optical signal transmission functionality provided by the optical multiplexing device 116, the clock and data recovery device 118, the laser driver device 120 and the video amplification device 122.

In a conventional deployment of a PON under the G.983 standard of the International Telecommunication Union (i.e., an ITU G.983 PON architecture), the optical fiber plant is a shared medium within the ITU G.983 PON architecture. However, transmission systems in accordance with the inventive disclosures made herein advantageously extend such sharing mechanisms used in G.983 (e.g., ranging, granting, timeslots, etc) into the electrical domain by extending the shared medium to include portions of the electrical domain. Accordingly, embodiments of transmission systems in accordance with the inventive disclosures made herein allow relatively high-cost optical module components (e.g., the optical multiplexing device 116, a clock and data recovery device 118, a laser driver device 120 and a video amplification device 122) to be shared across multiple co-located optical network termination units and/or a single optical network termination unit serving multiple users. By utilizing the same granting and upstream timeslot transmission techniques, the local PON TC termination units appear to be in the optical domain to the OLT. Furthermore, transmission system in accordance with the inventive disclosures made herein advantageously allow for flexibility in providing multiple service capabilities associated with adding additional electrical optical network termination units.

In contrast to electrical optical network termination units in accordance with the inventive disclosures made herein, a conventional optical network termination unit comprises components for facilitating optical signal transmission functionality provided by the optical multiplexing device 116, the clock and data recovery device 118, the laser driver device 120 and the video amplification device 122. In at least one embodiment of a conventional optical network termination unit, such a conventional optical network termination unit comprises an optical multiplexing device, a clock and data recovery device, a laser driver device and a video amplification device, These optical module components typically represent at least about 30% to 40% of the cost of such a conventional optical network termination unit. Accordingly, through sharing of such components in accordance with embodiments of the inventive disclosures made herein, the cost of an optical network termination unit can be dramatically reduced while also enhancing its reliability through fewer components.

The PON transmission convergence termination unit 110 of each optical network termination unit 102 and the shared electrical interface apparatus 104 are jointly configured for allowing the optical network termination units 102 to facilitate optical signal transmission via the shared optical transmission apparatus 106. Specifically, the PON transmission convergence termination unit 110 of each optical network termination unit 102 includes control logic for interacting with the buffering device 112 and the electrical multiplexing device 114 for enabling upstream and downstream signal transmission via the shared optical transmission apparatus 106. The electrical multiplexing device 114, which is preferably a prioritizing type multiplexing device, and the control logic allows the plurality of optical network termination devices 102 to individually and selectively control the shared optical transmission apparatus 106 for facilitating transmission of an optical upstream signal. The buffering device 112, which is preferably a 1:N type buffering device, facilitates broadcasting of a downstream signal such that content of the downstream signal is shared by all of the optical network termination units 102. In this manner, the functionality provided via the components of the shared electrical interface 104 and by the PON transmission convergence termination units enables distribution of optical signals in a novel, advantageous and useful manner that overcomes drawbacks associated with conventional ONTs in a PON system.

Figure 2:
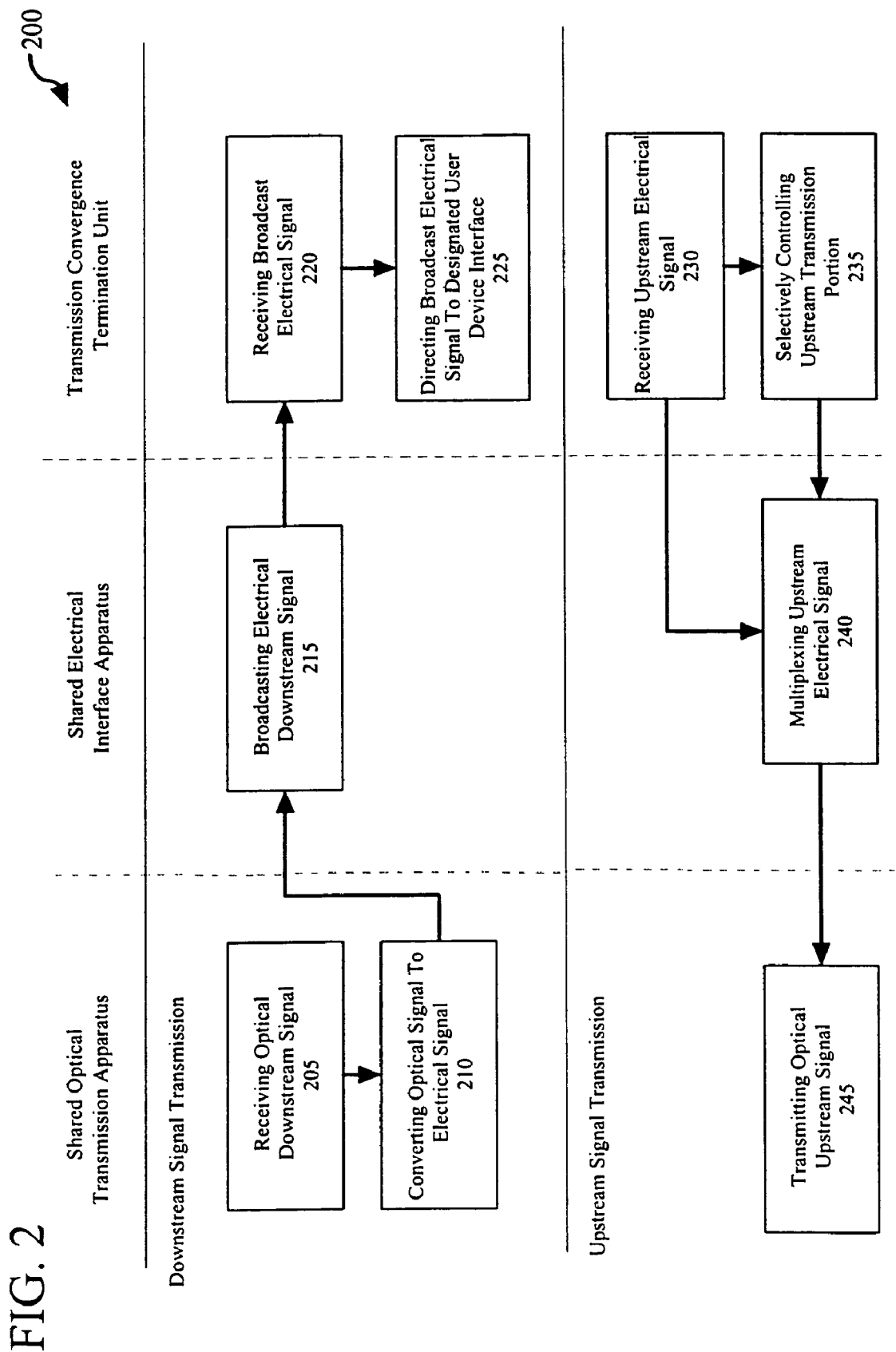
FIG. 2 depicts an embodiment of a method configured for facilitating signal transmission in a passive optical network in accordance with the inventive disclosures made herein.

FIG. 2 depicts an embodiment of a method 200 configured for facilitating signal transmission in a passive optical network in accordance with the inventive disclosures made herein. The method 200 enables both upstream and downstream signal transmission. The transmission system 100 discussed above in reference to FIG. 1 is one embodiment of a transmission system in accordance with the inventive disclosures made herein that is configured and capable of carrying out the method 200.

In facilitating downstream signal transmission in accordance with the method 200, an operation 205 is performed at the shared optical transmission apparatus for receiving an optical downstream signal. After receiving the optical downstream signal, an operation 210 is performed at the shared optical transmission apparatus for converting the optical downstream signal to an electrical downstream signal, followed by an operation 215 being performed at a downstream transmission portion of the shared electrical interface apparatus for broadcasting the electrical downstream signal toward the PON transmission convergence termination unit of at least one optical network termination unit. At the PON transmission convergence termination unit, an operation 220 is performed for receiving the broadcast electrical downstream signal, followed by an operation 225 being performed for directing the broadcast electrical downstream signal to a designated user device interface. In at least one embodiment, the operation 225 for directing the broadcast electrical downstream signal to a designated user device interface includes determining the designated user device interface.

In facilitating upstream signal transmission in accordance with the method 200, an operation 230 is performed at the PON transmission convergence termination unit for receiving an upstream electrical signal via a user device interface associated with the PON transmission convergence termination unit. After receiving the upstream electrical signal, an operation 235 is performed at the PON transmission convergence termination unit for selectively controlling an upstream transmission portion of the shared electrical interface apparatus and an operation 240 is correspondingly performed by the upstream transmission portion of the shared electrical interface apparatus for multiplexing the electrical upstream signal with other electrical upstream signals. Subsequently, an operation 245 is performed at the shared optical transmission apparatus for transmitting an optical upstream signal corresponding to the upstream electrical signal.

Referring now to computer readable medium, methods, processes and/or operations adapted for carrying out signal transmission functionality as disclosed herein are tangibly embodied by computer readable medium having instructions thereon for carrying out such functionality. In one specific embodiment, the instructions are tangibly embodied for carrying out the method 200 disclosed above to facilitate signal transmission via shared optical and electrical front-end components. The instructions may be accessible by one or more data processors (e.g., a logic circuit of a PON transmission convergence termination unit) from a memory apparatus (e.g. RAM, ROM, virtual memory, hard drive memory, etc), from an apparatus readable by a drive unit of the data processing system (e.g., a diskette, a compact disk, a tape cartridge, etc) or both. Accordingly, embodiments of computer readable medium in accordance with the inventive disclosures made herein include a compact disk, a hard drive, RAM or other type of storage apparatus that has imaged thereon a computer program (i.e., a set of instructions) adapted for carrying out signal transmission functionality in accordance with the inventive disclosures made herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A transmission system for a passive optical network, comprising:
   a shared optical transmission apparatus configured for being coupled to an optical line termination unit via an optical fiber;
   a shared electrical interface apparatus coupled to the shared optical transmission apparatus; and
   a plurality of transmission convergence termination units coupled to the shared electrical interface apparatus, wherein each one of said transmission convergence termination units is configured for selectively controlling the shared electrical interface apparatus to facilitate bi-directional signal transmission, wherein the shared optical transmission apparatus includes:
      an optical multiplexing device;
      a laser driver coupled between the optical multiplexing device and the shared electrical interface apparatus for enabling upstream transmission functionality; and
      a clock and data recovery device coupled between the optical multiplexing device and the shared electrical interface apparatus for enabling downstream transmission functionality, and
   wherein the shared electrical interface apparatus includes a 1:N type buffering device coupled between the shared optical transmission apparatus and each one of said transmission convergence termination units enabling downstream transmission functionality, and an electrical multiplexing device coupled between the shared optical transmission apparatus and each one of said transmission convergence termination units enabling upstream transmission functionality to facilitate the bi-directional signal transmission and wherein the transmission system shares front end components of the plurality of transmission convergence termination units such that the plurality of transmission convergence termination units are devoid of optical module components for facilitating optical signal transmission functionality.

2. The system of claim 1 wherein the shared electrical interface apparatus includes:
   a buffering device coupled between the shared optical transmission apparatus and each one of said transmission convergence termination units; and an electrical multiplexing device coupled between the shared optical transmission apparatus and each one of said transmission convergence termination units.

3. The system of claim 2 wherein each one of said transmission convergence termination units includes control logic configured for enabling selective control of the shared electrical interface apparatus.

4. The system of claim 1 wherein: each one of said transmission convergence termination units includes a plurality of user device interfaces; and each one of said transmission convergence termination units includes control logic configured for enabling selective control of the shared electrical interface apparatus to selectively facilitate transmission of information to between the shared electrical interface apparatus and each one of said user device interfaces.

5. The system of claim 1 wherein: each one of said transmission convergence termination units includes control logic configured for enabling selective control of the shared electrical interface apparatus the shared optical transmission apparatus includes an optical multiplexing device, a laser driver coupled between the optical multiplexing device and the shared electrical interface apparatus for enabling upstream transmission functionality, and a clock and data recovery device coupled between the optical multiplexing device and the shared electrical interface apparatus for enabling downstream transmission functionality; each one of said transmission convergence termination units includes a plurality of user device interfaces; and each one of said transmission convergence termination units includes control logic configured for enabling selective control of the shared electrical interface apparatus to selectively facilitate transmission of information between the shared electrical interface apparatus and each one of said user device interfaces.

6. A method for facilitating signal transmission in a passive optical network, comprising:

directing a downstream signal toward a designated user device interface in response to receiving the downstream signal from downstream transmission portion of a shared electrical interface apparatus;

selectively controlling an upstream transmission portion of the shared electrical interface apparatus for enabling transmission of an upstream signal via a shared optical transmission apparatus, and broadcasting the downstream signal from a prioritizing-type buffer of the shared electrical interface apparatus for reception by a plurality of transmission convergence termination units, wherein the signal transmission shares front end components of the plurality of transmission convergence termination units such that the plurality of transmission convergence termination units are devoid of optical module components for facilitating optical signal transmission functionality, thereby enabling delivery of the downstream signal to the designated user device interface of a corresponding one of said transmission convergence termination units;

wherein the upstream transmission portion includes an electrical multiplexing device unit enabling upstream transmission functionality to facilitate the bi-directional signal transmission;

wherein the shared optical transmission apparatus includes an upstream laser driver.

7. The method of claim 6, further comprising: broadcasting the downstream signal from the downstream transmission portion of the shared electrical interface apparatus for reception by a plurality of transmission convergence termination units, thereby enabling delivery of the downstream signal to the designated user device interface of a corresponding one of said transmission convergence termination units.

8. The method of claim 7 wherein the downstream transmission portion includes a 1:N type buffering device.

9. The method of claim 6 wherein: the upstream transmission portion includes an electrical multiplexing device; the shared optical transmission apparatus includes an upstream laser driver; and said selectively controlling the upstream portion of the shared electrical interface apparatus includes selectively controlling the electrical multiplexing device thereby selectively controlling access to the upstream laser driver.

10. The method of claim 9 wherein: the electrical multiplexing device is a prioritizing-type multiplexing device; and said selectively controlling the upstream portion of the shared electrical interface apparatus includes performing said selectively controlling in a prioritized manner with respect to a plurality of apparatuses coupled to and configured for controlling the electrical multiplexing device.

11. The method of claim 6, wherein said selectively controlling the upstream portion of the shared electrical interface apparatus includes selectively controlling the electrical multiplexing device thereby selectively controlling access to the upstream laser driver;

and wherein said selectively controlling the upstream portion of the shared electrical interface apparatus includes performing said selectively controlling in a prioritized manner with respect to a plurality of apparatuses coupled to and configured for controlling the electrical multiplexing device.

12. A transmission system for a passive optical network, comprising:

at least one data processing device configured for facilitating transmission convergence functionality; instructions processable by said at least one data processing device; and an apparatus from which said instructions are accessible by said at least one data processing device;

wherein said instructions are configured for enabling said at least one data processing device to facilitate:

directing a downstream signal toward a designated user device interface in response to receiving the downstream signal from downstream transmission portion of a shared electrical interface apparatus; and selectively controlling an upstream transmission portion of the shared electrical interface apparatus for enabling transmission of an upstream signal via a shared optical transmission apparatus, broadcasting the downstream signal from a prioritizing-type buffer of the shared electrical interface apparatus via a shared optical transmission apparatus for reception by a plurality of transmission convergence termination units, wherein the transmission system shares front end components of the plurality of transmission convergence termination units such that the plurality of transmission convergence termination units are devoid of optical module components for facilitating optical signal transmission functionality, thereby enabling delivery of the downstream signal to the designated user device interface of a corresponding one of said transmission convergence termination units;

wherein the upstream transmission portion includes an electrical multiplexing device of the shared optical transmission apparatus, wherein the shared optical transmission apparatus is comprised of the prioritizing-type buffer and the electrical multiplexing device;

wherein the shared optical transmission apparatus includes an upstream laser driver.

13. The system of claim 12 wherein: said at least one data processing device is coupled to said downstream transmission portion of the shared electrical interface apparatus; and said downstream transmission portion is configured for broadcasting the downstream signal for reception by a plurality of transmission convergence termination units, thereby enabling delivery of the downstream signal to the designated user device interface of a corresponding one of said transmission convergence termination units.

14. The system of claim 13 wherein: the upstream transmission portion includes an electrical multiplexing device; the shared optical transmission apparatus includes an upstream laser driver; and said instructions being configured for enabling said at least one data processing device to facilitate said selectively controlling includes said instructions being configured for enabling said at least one data processing device to facilitate selectively controlling the electrical multiplexing device thereby selectively controlling access to the upstream laser driver.

15. The system of claim 14 wherein: the electrical multiplexing device is a prioritizing-type multiplexing device; and said instructions being configured for enabling said at least one data processing device to facilitate said selectively controlling includes said instructions being configured for enabling said at least one data processing device to perform said selectively controlling in a prioritized manner with respect to a plurality of apparatuses coupled to and configured for controlling the electrical multiplexing device.

16. The system of claim 13 wherein the prioritizing-type multiplexing device is a 1:N type buffering device.

* * * * *

UNITED STATES PATENT AND TRADEMARK OFFICE
CERTIFICATE OF CORRECTION

PATENT NO. : 7,613,395 B2
APPLICATION NO. : 10/990157
DATED : November 3, 2009
INVENTOR(S) : Huffman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1212 days.

Signed and Sealed this

Nineteenth Day of October, 2010

David J. Kappos
*Director of the United States Patent and Trademark Office*